(12) United States Patent
Ruan (10) Patent No.: US 8,505,879 B2
(45) Date of Patent: Aug. 13, 2013

(54) RIGID TIE DOWN

(75) Inventor: Buqin Ruan, Zhugang Town (CN)

(73) Assignee: Zhejiang Topsun Logistic Control Co., Ltd., Taizhou (CN)

( * ) Notice: Subject to any disclaimer, the term of this patent is extended or adjusted under 35 U.S.C. 154(b) by 537 days.

(21) Appl. No.: 12/789,333

(22) Filed: May 27, 2010

(65) Prior Publication Data

US 2011/0176884 A1 Jul. 21, 2011

(30) Foreign Application Priority Data

Jan. 16, 2010 (CN) .......................... 2010 1 0005120
Jan. 25, 2010 (CN) ....................... 2010 2 0301498 U (51) Int. Cl.
*B66F 3/00* (2006.01)
*B21F 9/00* (2006.01)

(52) U.S. Cl.
USPC ............. 254/233; 254/232; 254/234; 403/44; 403/45

(58) Field of Classification Search
USPC ........... 254/231, 232, 233, 234, 235; 403/44, 403/45
See application file for complete search history.

(56) References Cited

U.S. PATENT DOCUMENTS

| | | | | |
|---|---|---|---|---|
| 1,037,615 A | * | 9/1912 | Grenier .......................... | 254/232 |
| 2,220,288 A | * | 11/1940 | Sarosdy ........................ | 254/232 |
| 2,360,019 A | * | 10/1944 | Ryan et al. ........................ | 403/44 |
| 2,813,733 A | * | 11/1957 | Herrmann ........................ | 403/44 |
| 2,818,229 A | * | 12/1957 | Guthans ........................ | 254/235 |
| 2,872,224 A | * | 2/1959 | Osborne ........................ | 403/40 |
| 3,065,007 A | * | 11/1962 | Colmer, Jr. ..................... | 403/45 |
| 4,069,902 A | * | 1/1978 | Zdeb ............................... | 192/43 |
| 4,130,269 A | * | 12/1978 | Schreyer ......................... | 403/45 |
| 4,135,834 A | * | 1/1979 | Bartman ......................... | 403/44 |
| 4,567,627 A | * | 2/1986 | Patterson et al. ........... | 24/68 CT |
| 4,830,339 A | * | 5/1989 | McGee et al. ................. | 254/235 |
| 5,611,521 A | * | 3/1997 | Grover et al. ................. | 254/235 |
| 7,451,962 B1 | * | 11/2008 | Kennedy ....................... | 254/233 |
| 7,552,913 B1 | * | 6/2009 | Amoss et al. ................. | 254/235 |

FOREIGN PATENT DOCUMENTS

CN 2846294 Y 12/2006

* cited by examiner

*Primary Examiner* — Emmanuel M Marcelo
(74) *Attorney, Agent, or Firm* — Minder Law Group; Willy H. Wong (57) ABSTRACT

The present invention discloses a rigid tie down in the field of mechanics, which addresses the problems of the existing tie downs, for example, they occupy a large space and have a low binding efficiency. The rigid tie down comprises a body, a first hook and a second hook provided on both ends of the body, and a handle connected to the body. The body has a cylindrical shape. The first hook has a first screw thereon, and the second hook has a second screw thereon. The first screw is threadedly connected with one end of the body, and the second screw is threadedly connected with the other end of the body. The direction of the threads of the first screw is reverse to that of the second screw. The rigid tie down could be operated in a convenient manner, have a high binding efficiency and occupy a small space.

14 Claims, 7 Drawing Sheets

RIGID TIE DOWN

BACKGROUND OF THE INVENTION

1. Field of Invention

The present invention relates to a tied down, in particular, to a rigid tie down in the field of mechanics.

2. Related Art

Goods usually desire to be bound during transportation by vehicles to prevent the goods falling off or colliding with each other to cause loss or damage during travel of the vehicles. Although cords are conventionally directly used to bind the goods, they are time and labor consuming and could hardly bind the goods tightly. The tie down is an advanced binding means, the use of which is very popular among drivers due to convenience and safety.

The conventional tie down is made of a support, a belt axis and a binding strap. The belt axis is connected to the support and rotatable. The binding strap is wound around the belt axis. A crowbar hole is set on the outer end of the belt axis beyond the support.

In order for the goods to be bound, the crowbar is inserted into the crowbar hole to turn the crowbar to drive the belt axis to rotate, thereby furling the binding strap, in which case the goods are bound tightly. However, since the tie down is fixed on the vehicle body and restricted to a certain position, the crowbar should be pulled out and inserted into another crowbar hole after the belt axis is driven to rotate by a certain angle through turning the crowbar during operation, and thus the belt axis could continue to rotate.

Meanwhile, the crowbar has to be repeatedly pulled out and inserted, bringing inconvenience in practical use. To this end, a control device for controlling the belt axis to rotate was designed. By using such a control device, some convenience is provided when the goods are bound, but the action is quite slow during untying the goods.

It could be understood that the current tie down is labor and time consuming during operation, and has a low binding efficiency or a low untying speed. Moreover, since the crowbar are continually pulled out and inserted, the finger(s) or other parts of the operator tend to be hurt.

To address the afore-mentioned problems, a Chinese patent document, the publication number of which is CN2846294Y, discloses a rapid-turn manual tie down device, comprising a reel axis, an end cap, a ratchet wheel means, and a retaining means. The ratchet wheel means is mounted at one end of the reel axis. The end cap is mounted on the other end of the reel axis via a retaining means. The retaining means could be formed by providing an internal ratchet wheel hole in the end cap and a pin hole at the belt axis in which a spring and a pin are provided. One end of the pin is pressed within the internal ratchet wheel hole. The end cap could displace the pin via the internal ratchet wheel hole, so as to drive the reel axis to tighten the binding strap; and the reel axis could not turn in a reverse direction with the action of the ratchet wheel means when the end cap reverses.

The rapid-turn manual tie down device mentioned above has a relatively complicated configuration and could only turn in one way with the ratchet wheel in cooperation with the pawl. In addition, the rapid-turn manual tie down device has low safety and reliability during operation. The binding strap of said device could not be loosened quickly, which impairs the efficiency thereof. Said device further occupies a larger space.

SUMMARY OF THE INVENTION

It is therefore an object of the present invention to provide a rigid tie down which has a simple configuration and could bind the goods tightly, so as to address the afore-mentioned problems existing in the prior art.

To accomplish the object thus mentioned, the present invention provides a rigid tie down, comprising a body, a first hook and a second hook provided on both ends of the body, and a handle connected to the body. The body has a cylindrical shape. The first hook has a first screw thereon, and the second hook has a second screw thereon. The first screw is threadedly connected with one end of the body, and the second screw is threadedly connected with the other end of the body. The direction of the threads of the first screw is reverse to that of the second screw.

According to the rigid tie down of the invention, the body is driven to rotate by the handle. Since the hooks linked with the goods could not be turned, the first screw and the second screw could be moved in or out with respect to the body during rotation of the body. In other words, the first hook and the second hook could be moved in or out with respect to the body, thereby accomplishing the binding operation.

The directions of the threads of the first screw and the second screw reverse to each other enable both the first screw and the second screw to move close to the central part of the body simultaneously or enable both the first screw and the second screw move out to both ends of the body simultaneously.

According to the rigid tie down of the invention, a locking mechanism is provided between the first screw and the body to lock or separate them.

After the goods are bound, the first screw could be locked with the body through the locking mechanism. In this case, the bound goods would not fall off or loosen.

During the binding operation, the first screw is detached from the body by the locking mechanism. The first hook is driven to move in or out during rotation of the body, thereby accomplishing the binding operation.

According to the rigid tie down of the invention, the locking mechanism comprises a first meshing element at the end of the body, a second meshing element rotationally fixed with the first screw, and a locking cylinder set on the outer side of the body. The second meshing element is located between the locking cylinder and the first meshing element. In addition, the locking cylinder could be pressed against the second meshing element and engage the second meshing element with the first meshing element after the locking cylinder moves.

When the locking cylinder is pressed against the second meshing element, the second meshing element is engaged with the first meshing element. The first meshing element could not be turned as the locking cylinder is pressed against the second meshing element all the time. That is to say, the body could not rotate relative to the first screw of the first hook, thereby achieving the purpose of locking.

When the locking cylinder is detached from the second meshing element, the body could rotate relative to the first screw of the first hook, thereby accomplishing the binding operation.

According to the rigid tie down of the invention, the first screw has a positioning slot in the axial direction. The second meshing element has an annular shape and a raised head protruded on the inner side thereof. The raised head is inserted in the positioning slot.

The raised head of the second meshing element is inserted in the positioning slot on the first screw of the first hook, so that the second meshing element is rotationally fixed with the first screw of the first hook.

According to the rigid tie down of the invention, the first meshing element is a one-way ratchet at the end of the body, and the second meshing element has a one-way ratchet at the end thereof, in which case said two one-way ratchets could be engaged with each other.

The first screw of the first hook would not be disengaged in the locking state with the one-way ratchet. However, the first screw of the first hook could further move to the central part of the body by a distance when the handle is continually turned. That is to say, the goods could be further tightened in the binding state.

According to the rigid tie down of the invention, a positioning mechanism is set between the locking cylinder and the body. The locking cylinder is pressed against the second meshing element, so that the locking cylinder could be fixedly connected to the body through the positioning mechanism when the first meshing element is engaged with the second meshing element.

The locking cylinder could be positioned via the positioning mechanism, so that the locking cylinder could be pressed against the second meshing element all the time, or the locking cylinder could be detached from the second meshing element all the time.

According to the rigid tie down of the invention, the positioning mechanist is implemented to be a bar-shape positioning hole obliquely set at the side of the locking cylinder and a convex pin 1b fixedly connected to the outer side of the body. The positioning hole has a concave locking seat at the end. The convex pin is set in the positioning hole.

As the convex pin is inserted in the positioning hole, the locking cylinder would be move in the axial direction relative to the body with the oblique positioning hole while the locking cylinder is turned. The convex pin could be positioned once the convex pin moves to the locking seat. In other words, the locking cylinder is positioned with respect to the body.

According to the rigid tie down of the invention, an elastic element is provided between the locking cylinder and the second meshing element. When the locking mechanism drives the first screw to move in synchronization with the body, the elastic element is closely pressed between the locking cylinder and the second meshing element.

The second meshing element could be tightly pressed against the first meshing element with the elastic force of the elastic element, thereby reliably engaging the first meshing element with the second meshing element.

According to the rigid tie down of the invention, the elastic element is an annular metal spring plate. The metal spring plate could not only exert an elastic force on the second meshing element, but also occupies a small space, because the spacing between the locking cylinder and the second meshing elements is relatively short.

According to the rigid tie down of the invention, a concave restriction slot is provided on the inner side at the end of the locking cylinder. The second meshing element is located at the restriction slot. Such a configuration ensures the second meshing element could be separate from the first meshing element while the locking mechanism is in a separate status.

According to the rigid tie down of the invention, a positioning seat is set on the inner side of the end of the locking cylinder. A washer is fixed at the positioning seat in an axial direction. The elastic element is located between the second meshing element and the washer. The metal spring plate could be positioned by the washer, so as not to be disengaged.

According to the rigid tie down of the invention, the handle is composed of a connecting part and a grip part. The connecting part is provided with a pawl and a link mechanism which could be detachably connected to the ratchet wheel. Furthermore, the pawl on the handle could be inserted among the teeth of the ratchet wheel when the connecting part of the handle is connected to the ratchet wheel through the link mechanism.

The operation principles of the rigid tie down of the present invention would be described as follows. When the goods are to be bound, the connecting part of the handle is connected to the ratchet wheel via the link mechanism, in which case the pawl on the connecting part of the handle could be inserted among the teeth of the ratchet wheel. When the handle is fixed, it is turned to drive the body to rotate, thereby moving the hooks at both ends of the body to the central part of the body. This way, the goods are bound tightly. During transportation of the goods, the connecting part of the handle could be detached from the ratchet wheel. In particular, if the handle is removed, the weight of the tie down would be reduced, which is conducive to transportation of the goods. When the goods are to be unloaded, the handle has to be mounted on the ratchet wheel in the manner described and turned in a reverse direction to drive the body to rotate. In this situation, the hooks at both ends of the body would move to the ends of the body, and are finally removed from the body. Therefore, the goods are released.

According to the rigid tie down of the invention, the link mechanism is consisted of a covering and a clasp. One end of the covering and the clasp are hinged to the connecting part. The other end of the covering could be combined with the clasp. A bore matched with the ratchet wheel is formed between the covering and the connecting part after the covering is combined with the clasp.

Such a configuration would facilitate in mounting and removing the handle. In order for the handle to be mounted, the covering would be rotated about the hinging point at the connecting part till the covering is covered on the body, and then the clap is turned to buckle the covering, so that the body is fixed by locking the covering. Said mechanism is conducive to mounting and removing, has a solid structure, and tends not to be damaged.

According to the rigid tie down of the invention, a spring is set between the clasp and the connecting part, so as to generate an elastic force on the clasp and drive the clasp to buckle the covering. Thus, the structure is more reliable.

According to the rigid tie down of the invention, the pawl could be hinged to the connecting part. A pressure spring could be provided between the connecting part and the pawl. Therefore, an elastic force could also be generated on the pawl, to enable the pawl to be inserted among the teeth of the ratchet wheel when the covering is covered on the body.

According to the rigid tie down of the invention, a reset elastic element is provided between the covering and the connecting part. The covering tends to swing out about the hinging portion thereof with the elastic force of the reset elastic element.

By using such a configuration, the covering tends to move away from the body with the elastic element, so that the covering would be combined with the clasp in a more reliable way when the clasp buckles the covering.

According to the rigid tie down of the invention, the reset elastic element is a sheet-like flexible elastic metal plate, one end of which is fixedly connected with the connecting part, and the other end of which is fixedly connected with the covering. The meal spring plate has a simple structure and good flexibility, and could be easily mounted between the covering and the connecting part.

Compared with the prior art, the screws of the first hook and the second hook of the rigid tie down are threadedly connected with both ends of the body respectively. Therefore, the first hook and the second hook could be driven to move in or out directly by turning the handle, thereby accomplishing the binding operation. In this case, only the handle has to be turned during operation, which is simple and easy to be implemented.

Meanwhile, the bound goods would not loosen or fall off by using the locking mechanism. Furthermore, the goods could be further tightened. Thus, the rigid tie down of the invention could achieve an improved reliability.

In addition, the handle is detachable, and is conducive to mounting and removing. The goods would not be impaired and the rigid tie down occupies a small space during transportation. Moreover, said rigid tie down could be used in a convenient way.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
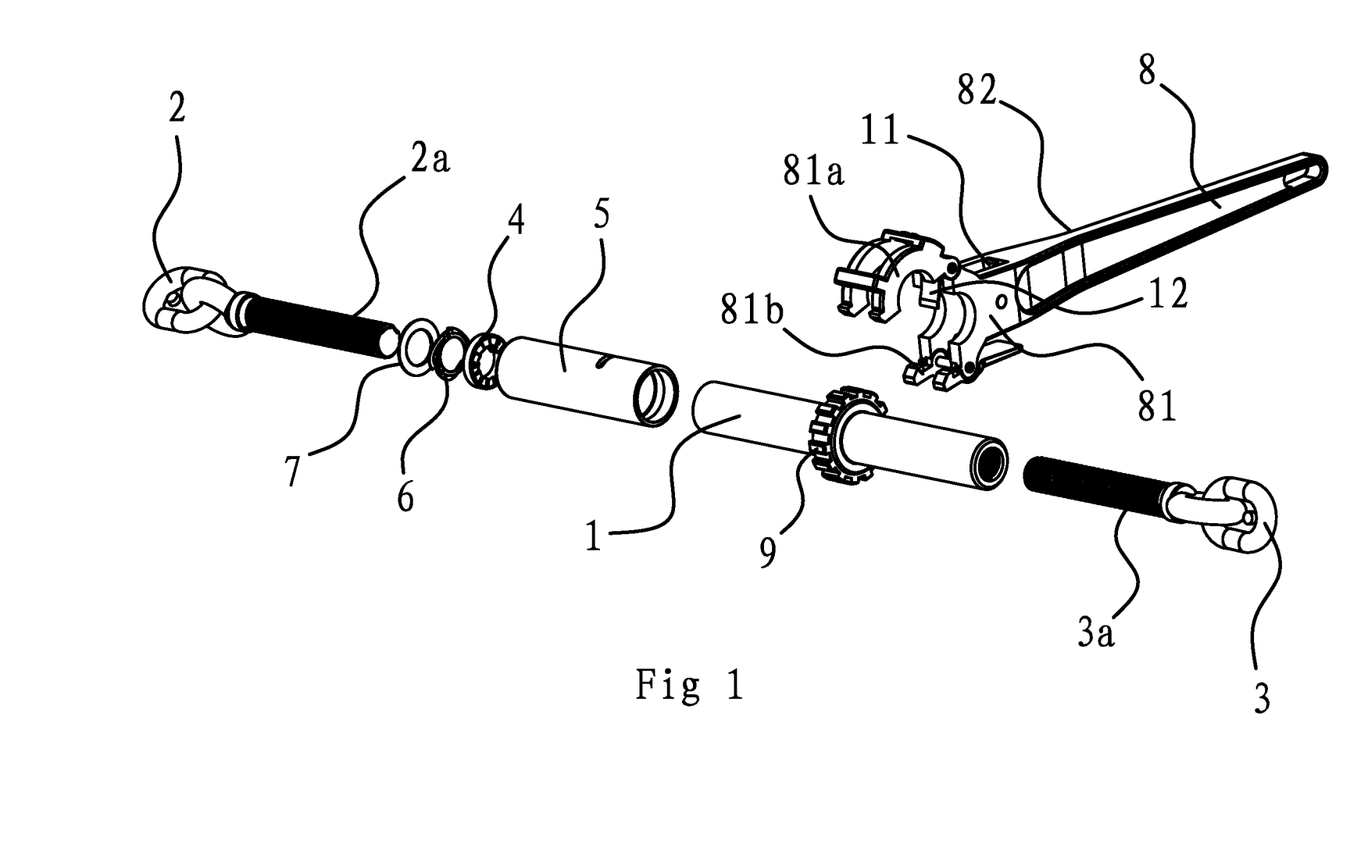
FIG. 1 is an exploded view of the rigid tie down of the invention.
Figure 2:
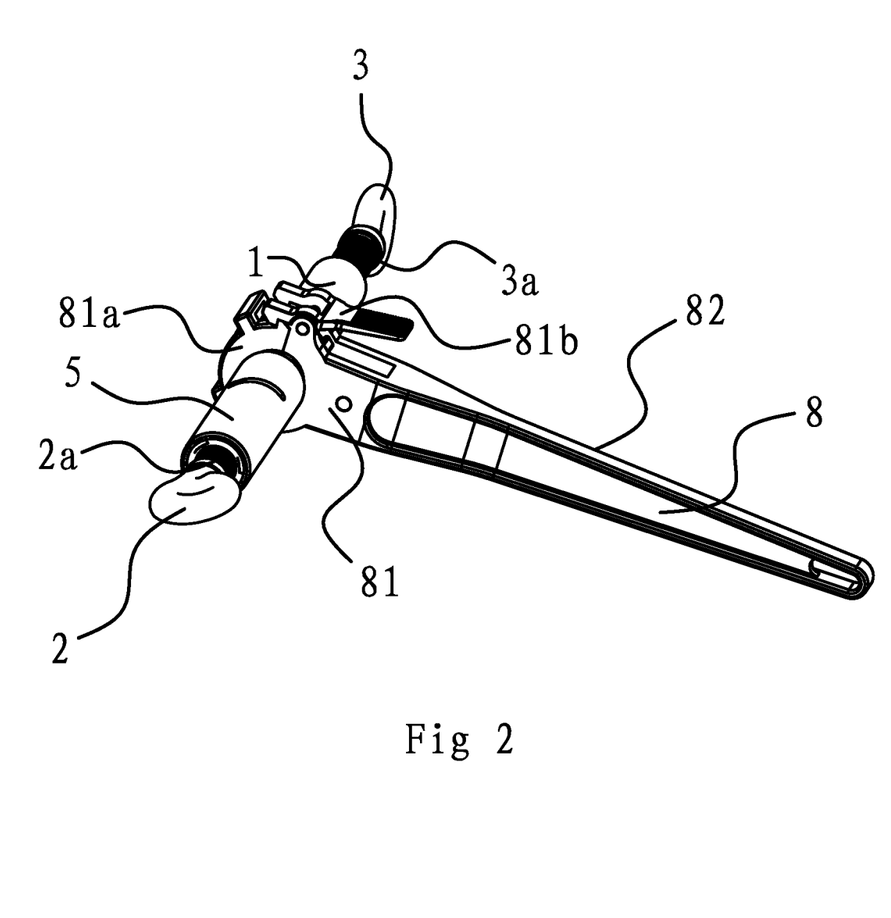
FIG. 2 is a stereogram of the rigid tie down of the invention.

As shown in FIGS. 1 and 2, the rigid tie down of the invention includes a body 1, a first hook 2 and a second hook 3. The body 1 has a cylindrical shape. The first hook 2 has a first screw 2a integrated therewith. The second hook 3 has a second screw 3a integrated therewith. The first screw 2a of the first hook 2 is threadedly connected with one end of the body 1. The second screw 3a of the second hook 3 is threadedly connected with the other end of the body 1. In other words, both ends of the body 1 are respectively covered on and threadedly connected with the first screw 2a and the second screw 3a. The threads of the first screw 2a of the first hook 2 are reverse to those of the second screw 3a of the second hook 3. A handle 8 is connected with the body 1.

Figure 3:
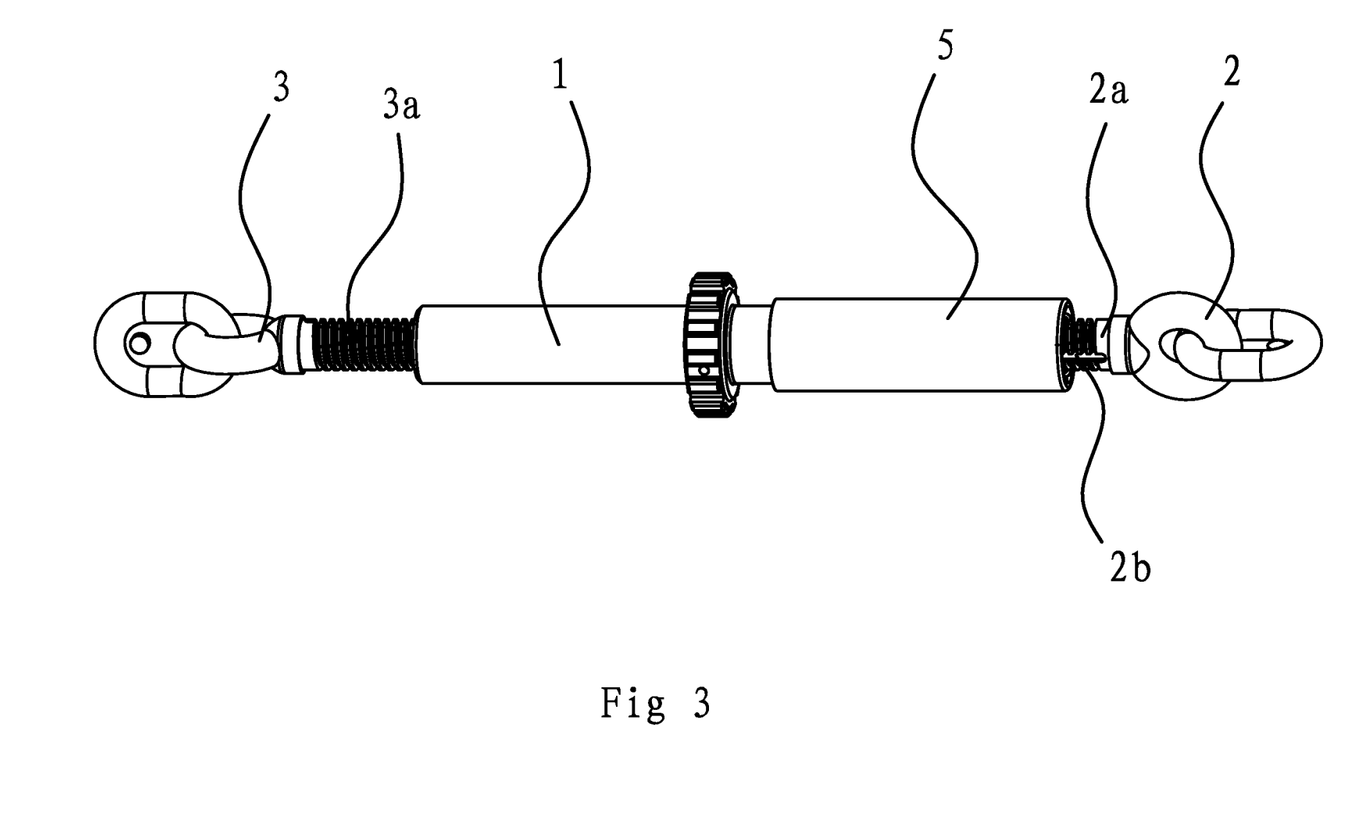
FIG. 3 is a front view of the rigid tie down of the invention.
Figure 4:
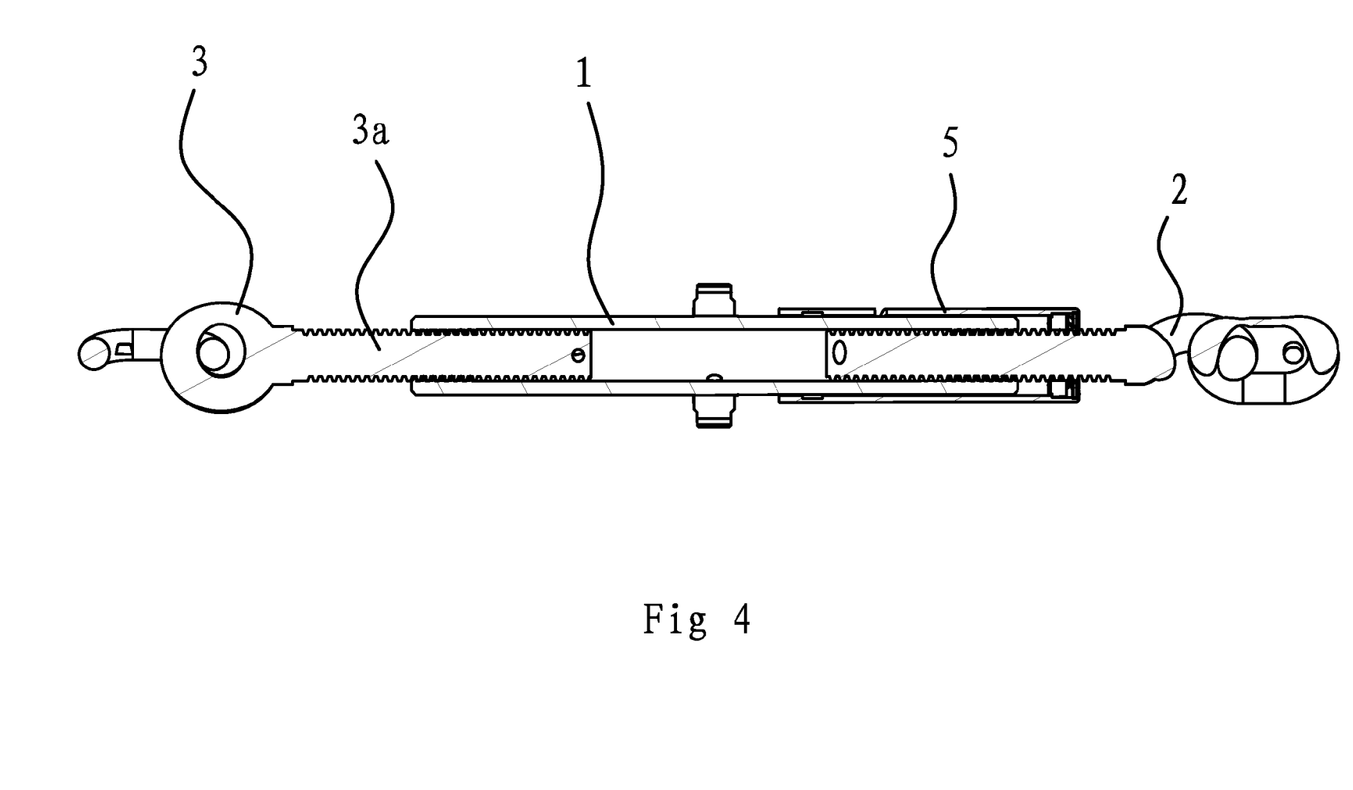
FIG. 4 is a sectional view of the rigid tie down of the invention.
Figure 5:
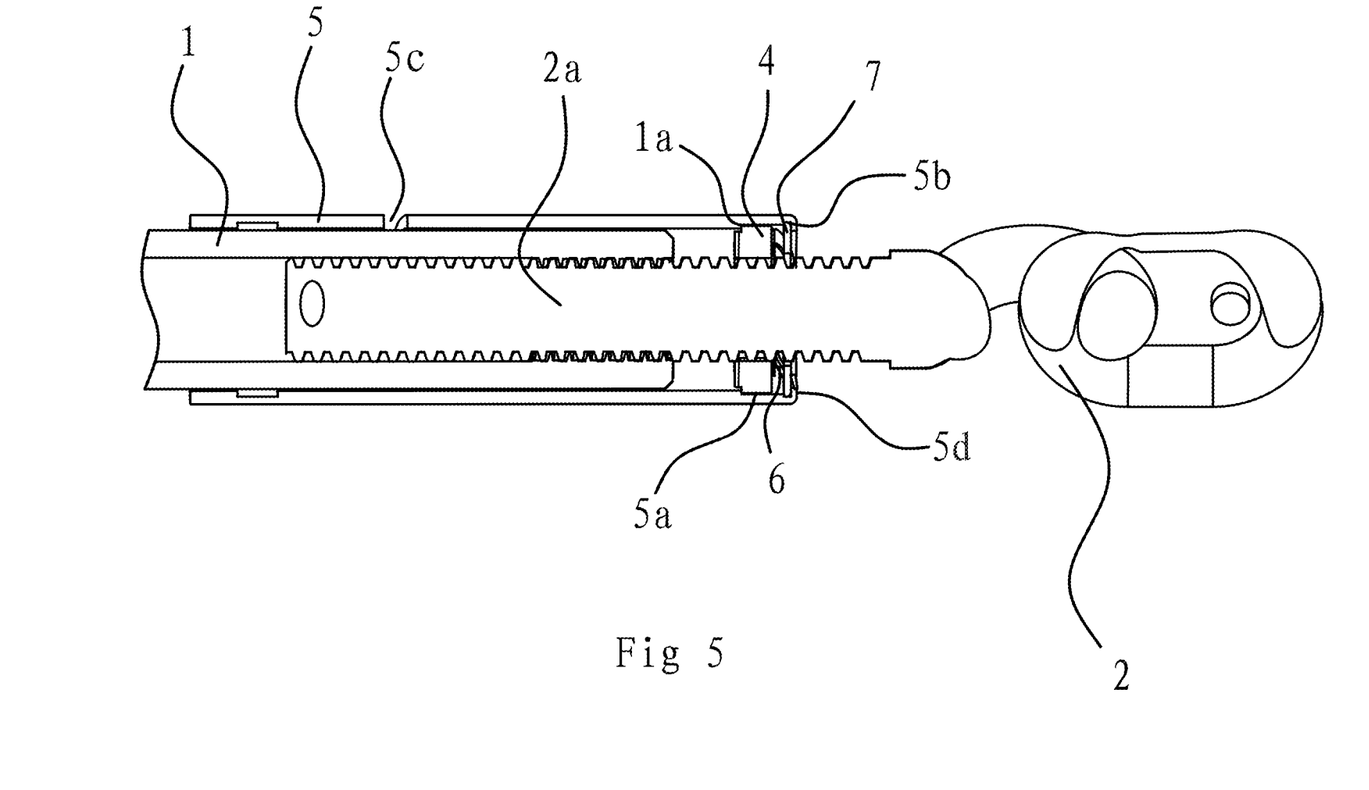
FIG. 5 is a partial sectional view of the first hook of the rigid tie down of the invention.

As shown in FIGS. 3, 4 and 5, a locking mechanism is provided between the first screw 2a of the first hook 2 and the body 1 to lock or separate them. The locking mechanism includes a first meshing element 1a at the end of the body 1, a second meshing element 4 rotationally fixed with the first screw 2a of the first hook 2, and a locking cylinder 5 set on the outer side of the body 1. The second meshing element 4 is located between the end 5d of the locking cylinder 5 and the first meshing element 1a. In a locked position, where the end 5d of locking cylinder 5 is pressed against the second meshing element 4, the second meshing element 4 is capable of engaging with the first meshing element 1a. In an unlocked position, the end 5d is positioned away from second meshing element 4 and the two meshing elements are disengaged.

Figure 7:
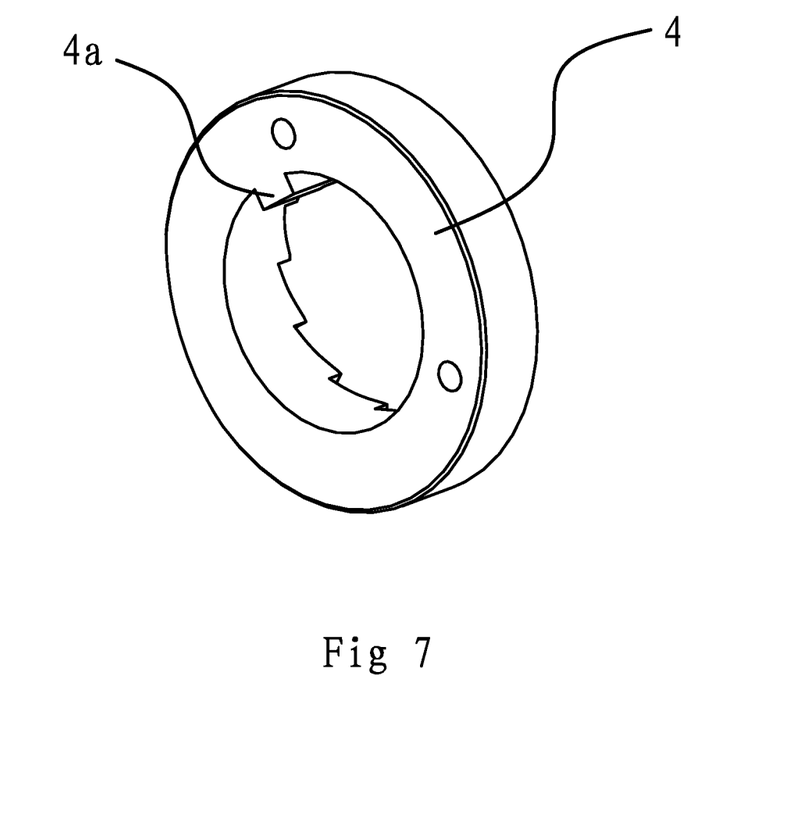
FIG. 7 is a stereogram of the second meshing element of the rigid tie down of the invention.

As shown in FIG. 3, the first screw 2a of the first hook 2 has a positioning slot 2b in the axial direction thereof. As shown in FIG. 7, the second meshing element 4 has an annular shape and a raised head 4a protruded on the inner side thereof. The raised head 4a is inserted in the positioning slot 2b. The second meshing element 4 is rotationally fixed on the first screw 2a of the first hook 2.

In the present embodiment, the first meshing element 1a is a one-way ratchet at the end of the body 1, and the second meshing element 4 also has a one-way ratchet at the end thereof. When the two meshing elements are engaged in the locked position and the body 1 is turned in a tightening direction, ratchet teeth of first element 1a engages ratchet teeth of the second meshing element 4, thereby screwing the first screw 2a into the body 1. When the two meshing elements are engaged in the locked position and the body 1 is turned in a loosening direction, the sloped sides of the one-way ratchet of the first meshing element 1a slides across the sloped sides of the one-way ratchet of the second meshing element 4 such that the first screw 2a does not turn in the loosening direction with the body 1. In the unlocked position, the two meshing elements are disengaged and rotation of the body 1 does not affect the first screw 2a from turning in either direction.

An elastic element 6 is provided between the end 5d of the locking cylinder 5 and the second meshing element 4. When the locking mechanism drives the first screw 2a of the first hook 2 to move in synchronization with the body 1, the elastic element 6 is closely pressed between the end 5d of the locking cylinder 5 and the second meshing element 4. In the present embodiment, the elastic element 6 is an annular metal spring plate. A concave restriction slot 5a is provided on the inner side at the end of the locking cylinder 5. The second meshing element 4 is located at the restriction slot 5a.

A positioning seat is set on the inner side of the end of the locking cylinder 5. A washer 7 is fixed at the positioning seat 5b in an axial direction. The elastic element 6 is located between the second meshing element 4 and the washer 7.

In addition, a positioning mechanism is set between the locking cylinder 5 and the body 1. The positioning mechanism includes a rectangle-shaped positioning hole 5c obliquely set at the side of the locking cylinder 5 and a convex pin fixedly connected to the outer side of the body 1. The positioning hole 5c has a concave locking seat at the end. The convex pin is set in the positioning hole 5c.

In order to put the rigid tie down of the invention into operation, the rigid tie down is placed in its unlocked position. To get the rigid tie down into the unlocked position from the locked position, the locking cylinder 5 is rotated about the body 1, which causes the locking cylinder 5 to slide and move in the direction away from ratchet wheel 9. This causes the locking cylinder 5 to separate from the second meshing element 4. In this case, the first meshing element 1a is not engaged with the second meshing element 4. During rotation of the body 1 by turning the handle 8, since the first hook 2 and the second hook 3 are not turned, the first hook 2 and the second hook 3 could be moved in or out with respect to the body 1 during rotation of the body 1, thereby accomplishing the binding operation.

Once the goods are bound, the locking cylinder 5 is locked with the body 1 through the positioning mechanism, and then the first screw 2a of the first hook 2 is locked with the body 1 through the locking mechanism. When the rigid tie down is in this locked position, the first hook 2 is linked with the body 1, and the first hook 2 would not be moved out with respect to the body 1 during rotation of the body 1. That is to say, after the goods are bound, the ratchet teeth of the first meshing element 1a is engaged with the ratchet teeth of the second meshing element 4, and the first screw 2a of the first hook 2 cannot move in the loosening direction, thereby binding the goods tightly. In one embodiment, the convex pin on the body 1 is inserted at the locking seat of the positioning hole 5c of the locking cylinder 5. The convex pin is located at the locking seat all the time and could not be disengaged with the elastic force of elastic element 6.

As both the first meshing element 1a and the second meshing element 4 are one-way ratchets, the first screw 2a of the first hook 2 could be further moved in though not exit while the handle 8 is continually turned. That is to say, once the goods are bound and locked by the locking mechanism, the first hook 2 could be further moved in by turning the handle 8. In this case, the goods could be further tightened after being bound.

It should be understood the locking mechanism could be provided between the second hook 3 and the body 1 as an alternative.

Figure 6:
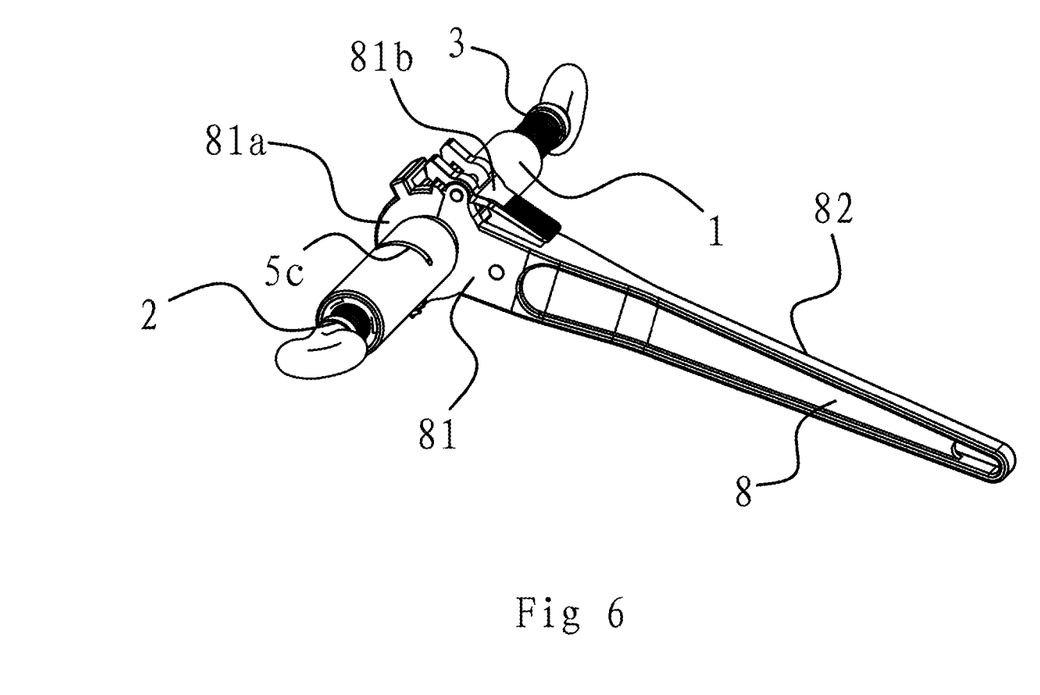
FIG. 6 is a perspective view of the handle of the rigid tie down of the invention when it is detached from the body.

In FIG. 6, the handle 8 is composed of a connecting part 81 and a grip part 82. The connecting part 81 is provided with a pawl 11 and a link mechanism which could be detachably connected to the ratchet wheel 9. The link mechanism is consisted of a covering 81a and a clasp 81b. One end of the covering 81a and the clasp 81b are hinged to the connecting part 81. The other end of the covering 81a could be combined with the clasp 81b. A bore matched with the ratchet wheel 9 is formed between the covering 81a and the connecting part 81 after the covering 81a is combined with the clasp 81b. The pawl 11 on the handle 8 could be inserted among the teeth 9a of ratchet wheel 9 after the connecting part 81 of the handle 8 is connected with the ratchet wheel 9 via the link mechanism.

A spring is set between the clasp 81b and the connecting part 81. The pawl 11 is hinged to the connecting part 81. A pressure spring is provided between the connecting part 81 and the pawl 11.

A reset elastic element 12 is provided between the covering 81a and the connecting part 81m, which is in flush with the inner side of the connecting part 81 and the covering 81a. In particular, the reset elastic element 12 is a sheet-like flexible elastic metal plate, one end of which is fixedly connected with the connecting part 81, and the other end of which is fixedly connected with the covering 81a. The covering 81a tends to swing out about the hinging portion thereof with the elastic force of the reset elastic element 12.

As shown in FIGS. 1 and 6, when the rig tie down of the invention is used to bind the goods, the goods are bound by the hooks 2 and 3 connected to both ends of the body, the handle 8 is mounted on the body 1, and the hooks 2 and 3 would be moved in by turning the handle 8, and the goods are thus bound. As shown in FIGS. 1, 2 and 7, when the handle 8 is mounted on the body 1, the connecting part 81 of the handle 8 is connected with the ratchet wheel 9 set on the body 1. The covering 81a buckles the ratchet wheel 9, and then the clasp 81b buckles the covering 81a. In this case, the handle 8 would not fall off from the body 1. The hooks 2 and 3 could be further tensioned or loosened by turning the handle 8. During transportation of the goods, the handle 8 could be removed, and the goods would not be impaired correspondingly. When the goods are to be unloaded, the operator merely has to turn the handle 8 in a reverse direction to loosen the hooks 2 and 3, as shown in FIG. 4. Therefore, the goods are unloaded.

Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

Thus, regardless of the content of any portion (e.g., title, field, background, summary, description, abstract, drawings, etc.) of this application, unless clearly specified to the contrary, such as via explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

any elements can be integrated, segregated, and/or duplicated;

any activity can be repeated, any activity can be performed by multiple entities, and/or any activity can be performed in multiple jurisdictions; and any activity or element can be specifically excluded, the sequence of activities can vary, and/or the interrelationship of elements can vary.

Accordingly, every portion (e.g., title, field, background, summary, description, abstract, drawing figure, etc.) of this application, other than the claims themselves, is to be regarded as illustrative in nature, and not as restrictive.

LIST OF REFERENCE NUMERALS 1 body
1a first meshing element
2 first hook
2a first screw
2b positioning slot
3 second hook
3a second screw
4 second meshing element
4a raised head
5 locking cylinder
5a restriction slot
5c positioning hole
6 elastic element
7 washer
8 handle
81 connecting part
82 grip part
81a covering
81b clasp
9 ratchet wheel
9a tooth
10 hook
11 pawl
12 reset elastic element

What is claimed is:
1. A rigid tie down, comprising:
a body having a cylindrical shape;
a first hook and a second hook provided on two ends of the body, the first hook having a first screw, the second hook having a second screw, the first screw capable of being threadedly connected with a first end of the body, the second screw capable of being threadedly connected with a second end of the body, the direction of the threads of the first screw is reverse to that of the second screw;

a locking mechanism provided between the first screw and the body; and a handle connected to the body;

wherein the locking mechanism comprises a first meshing element at the first end of the body, a second meshing element rotationally fixed with the first screw, and a locking cylinder set on an outer side of the body, wherein the second meshing element is located between a first end of the locking cylinder and the first meshing element, and the first end of the locking cylinder is capable of being pressed against the second meshing element and causing the second meshing element to engage with the first meshing element after the locking cylinder moves.

2. The rigid tie down as claimed in claim 1 wherein the first screw has a positioning slot in the axial direction, the second meshing element has an annular shape and a raised head protruded on an inner side thereof, and the raised head is capable of being inserted in the positioning slot.

3. The rigid tie down as claimed in claim 2 wherein a positioning mechanism is provided between the locking cylinder and the body, and the locking cylinder is capable of being pressed against the second meshing element, so that the locking cylinder is fastened to the body through the positioning mechanism when the first meshing element is engaged with the second meshing element.

4. The rigid tie down as claimed in claim 1 wherein the second meshing element has a one-way ratchet at the end thereof.

5. The rigid tie down as claimed in claim 4 wherein a positioning mechanism is provided between the locking cylinder and the body, and the locking cylinder is capable of being pressed against the second meshing element, so that the locking cylinder is fastened to the body through the positioning mechanism when the first meshing element is engaged with the second meshing element.

6. The rigid tie down as claimed in claim 1 wherein a positioning mechanism is provided between the locking cylinder and the body, and the locking cylinder is capable of being pressed against the second meshing element, so that the locking cylinder is fastened to the body through the positioning mechanism when the first meshing element is engaged with the second meshing element.

7. The rigid tie down as claimed in claim 6 further comprising a positioning hole obliquely set at a side of the locking cylinder.

8. The rigid tie down as claimed in claim 6 wherein an elastic element is provided between the locking cylinder and the second meshing element, and when the locking mechanism drives the first screw to move in synchronization with the body, the elastic element is capable of being closely pressed between the locking cylinder and the second meshing element.

9. The rigid tie down as claimed in claim 8 wherein the elastic element is an annular metal spring plate.

10. The rigid tie down as claimed in claim 9 wherein a concave restriction slot is provided on an inner side at the end of the locking cylinder, and the second meshing element could be located at the restriction slot.

11. The rigid tie down as claimed in claim 8 wherein a positioning seat is provided on an inner side of the end of the locking cylinder, a washer is fixed at the positioning seat in an axial direction, and the elastic element is located between the second meshing element and the washer.

12. A rigid tie down, comprising:

a body having a cylindrical shape;

a first hook and a second hook provided on two ends of the body, the first hook having a first screw, the second hook having a second screw, the first screw capable of being threadedly connected with a first end of the body, the second screw capable of being threadedly connected with a second end of the body, the direction of the threads of the first screw is reverse to that of the second screw;

a handle connected to the body, the handle having a connecting part and a grip part, the connecting part having a pawl and a link mechanism detachable from the ratchet wheel, the pawl on the handle capable of being inserted among teeth of a ratchet wheel when the connecting part of the handle is connected to the ratchet wheel through the link mechanism, the link mechanism having a covering and a clasp, one end of the covering capable of being hinged to the connecting part, the other end of the covering capable of being combined with the clasp, the pawl capable of being hinged to the connecting part;

a spring between the clasp and the connecting part;

a pressure spring between the connecting part and the pawl; and a reset elastic element between the covering and the connecting part, the covering tending to swing out about a hinging portion thereof with the elastic force of the reset elastic element;

wherein a bore matched with the ratchet wheel is formed between the covering and the connecting part after the covering is combined with the clasp.

13. The rigid tie down as claimed in claim 12 wherein the reset elastic element is a flexible elastic metal plate, one end of which is fastened to the connecting part, and the other end of which is fastened to the covering.

14. The rigid tie down as claimed in claim 13 wherein the reset elastic element is flush with an inner side of the connecting part and the covering.

* * * * *